United States Patent [19]

Brouneus

[11] 3,732,432
[45] May 8, 1973

[54] TEMPERATURE CONTROL SYSTEMS

[75] Inventor: Harold A. Brouneus, Painted Post, N.Y.

[73] Assignee: Corning Glass Works, Corning, N.Y.

[22] Filed: May 4, 1972

[21] Appl. No.: 250,162

[52] U.S. Cl. ................... 307/117, 219/499, 340/233
[51] Int. Cl. ............................................. H01h 35/00
[58] Field of Search ..................... 307/117, 116, 118; 219/499, 497, 494, 501; 340/227, 233; 323/22

[56] References Cited

UNITED STATES PATENTS 3,514,628   5/1970   Pinckaers ............................. 307/117

*Primary Examiner*—Herman J. Hohauser
*Attorney*—Clarence R. Patty, Jr. et al.

[57] ABSTRACT

Temperature control systems or regulating circuits for use with electrical heating elements of burners of electric ranges, hot plates or cook-tops, such circuits and elements being directly energized from conventional or commercial sources of power, such as 60 c.p.s. alternating current sources of 120 or 240 volts, and which systems provide high-temperature sensing and adequate temperature-limiting. An encapsulated high-temperature wire sensor is used in conjunction with thermal or electromagnetically actuated devices or relays, and solid state circuitry comprising a balanced amplifier-detector and at least one silicon controlled rectifier as a switch or switching device. The necessity for a step-down transformer is eliminated by the systems disclosed and an economic advantage is thereby attained. The control systems are especially suitable for use with electrically heated glass-ceramic cook-tops in order to provide higher temperatures and improved cooking performance when cooking vessels with non-flat bottoms are used with such cook-tops, while at the same time providing temperature-limiting of the burner system of the cook-tops for both electric heating-element protection and cook-top protection.

8 Claims, 8 Drawing Figures

TEMPERATURE CONTROL SYSTEMS

BACKGROUND OF THE INVENTION

Until relatively recently, mechanical, electromechanical and/or gaseous fluid components have usually been used as temperature sensing and control devices in temperature control or regulating systems for electric burners or heating elements because no other types of relatively compact and substantially reliable components were available. With the advent of solid state electrical current control components such as transistors, and switching devices such as silicon controlled rectifiers, it was readily recognized that such components and switching devices could be advantageously used in temperature sensing and control or regulating systems to attain increased compactness without sacrifice of reliability. There were, however, economic drawbacks since said components and/or devices initially were quite expensive and are still relatively so when compared with corresponding mechanical or electromechanical components and/or devices used in temperature control systems. Accordingly, temperature control or regulating systems using mechanical or electromechanical control devices and components are still used most extensively. The systems of the present invention were, therefore, developed to provide relatively economical temperature control systems using solid-state control components and devices where practicable. The systems of the present invention may also be used for controlling or regulating higher temperatures than was heretofore possible with the components or devices previously usually used in temperature control systems of the types mentioned.

SUMMARY OF THE INVENTION

An adequate broad summary of the invention is believed set forth in the foregoing abstract of the disclosure and, therefore, for the sake of brevity, and in order to prevent repetition or redundancy, no further summary of the invention is considered necessary or will be given.

BRIEF DESCRIPTION OF THE DRAWINGS

In the drawings.

Similar reference characters refer to similar parts in each of the figures of the drawings.

PREFERRED EMBODIMENTS OF THE INVENTION

Figure 1:
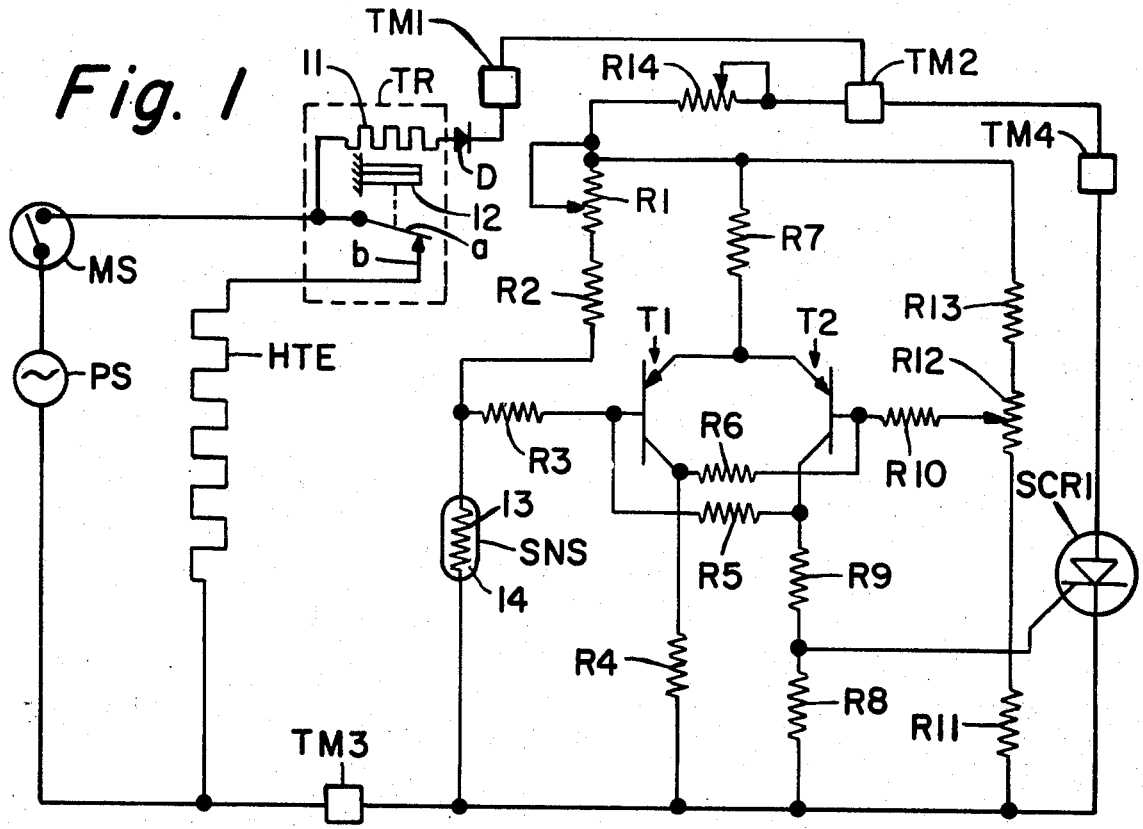
FIG. 1 is a schematic circuit diagram of a first or basic embodiment of the invention suitable for use with a 120 volt 60 c.p.s. source of alternating current.

Referring first to FIG. 1 there is shown a normally open master electric switch MS which has one of its terminals connected with one side or terminal of a power source PS which may, for example, comprise a conventional commercial 120 volt, 60 c.p.s. source of alternating current. The second terminal of switch MS is connected, in multiple, with a movable contact member $a$ of a thermal type relay TR and a first end of a heater winding or coil 11 of such relay. Contact member $a$ of relay TR is normally in contact with a fixed contact member $b$ of such relay, that is, contact member $a$ is closed against fixed contact member $b$ when relay TR is in its so-called released position shown. Contact $b$ of relay TR is connected with a first end of an electrical resistance heating element or coil HTE whose second end is connected, in multiple, with the second side or terminal of previously mentioned power source PS and a terminal designated TM3. Element HTE is, for example, the heating element of a burner of an electric range, hotplate or cook-top in conjunction with which the temperature control or regulating system of the present invention is intended to be or may be used. This will be readily apparent to those skilled in the art.

Returning to relay TR, the second end of heater winding or coil 11 of the relay is connected through a diode D, in the low resistance direction of such diode, with a terminal TM1. Relay TR further includes a bimetallic element 12 which is disposed in a thermal transfer relationship adjacent winding 11 of such relay. Element 12 is mechanically connected to the aforesaid movable contact member $a$ of relay TR. Thus, as previously mentioned, contact member $a$ is normally closed against fixed contact member $b$, that is, is in a circuit closing position against such fixed contact member whenever winding 11 is at a sufficiently low temperature or has been deenergized for a sufficient period of time that element 12 operates to actuate contact member $a$ to its position shown. When winding or coil 11 is initially energized, element 12 does not operate to open contacts $a-b$ of the relay immediately, but such operation is delayed until winding or coil 11 has been energized for a sufficient period of time to sufficiently heat element 12 for it to operate to open contacts $a-b$. Element 12 is provided with a snap-action feature so that it actuates contact $a$ quickly to fully open and fully closed conditions of contacts $a-b$ rather than slowly actuate said contact to creep to the open and closed conditions of contacts $a-b$. Thermal relays such as TR and the snap-acting feature of element 12 and its associated contacts, such as $a-b$, are old and well known in the art. The heater winding or coil 11 of relay TR may, for example, have a resistance of about 1,800 ohms.

There is further shown in FIG. 1 a pair of transistors T1 and T2, a silicon controlled rectifier SCR1, and a temperature sensor SNS preferable of a type comprising a coil or winding 13 of a material having a relatively high temperature coefficient of electrical resistance, and embodied in a suitable hollow sheath 14 of a high temperature oxidation resistant material surrounded by a compacted powder of an electrical insulating material having a relatively high thermal conductivity. Sensor SNS is, in practice, located in a close thermal transfer relationship with the aforesaid heating element or winding HTE as will be readily apparent to those skilled in the art. Sensor SNS may, for example, be similar to the temperature sensor illustrated by FIGS. 1 and 1a of copending U.S. Pat. application, Ser. No. 227,095, filed Feb. 17, 1972 by John F. Frazier and Garo M. Ziver, and assigned to the same assignee as the present application. However, the sensor is shown only schematically in FIG. 1. Sensor SNS may, for example, have a resistance of 50 ohms ± 2 ohms at a temperature of 20°C, such resistance increasing, substantially linearly, to a resistance of 100 ohms ± 2 ohms at a temperature of 700°C.

The emitters of the above mentioned transistors T1 and T2 are connected with each other and with one end of a resistor R7 whose second end is connected, in multiple, with one end of a taper wound potentiometer R1 and one end of a resistor R13. Said one end of potentiometer R1 also connects with a first end of an adjustable resistor R14 whose second end connects through terminals TM2 and TM4 with the anode of previously mentioned rectifier SCR1. Terminal TM2 also connects with previously mentioned terminal TM1. The second end of potentiometer R1 connects with a first end of a resistor R2 whose second end is connected, in multiple, with a first end of a resistor R3 and one end of the winding of said sensor SNS. The second end of resistor R3 is connected, in multiple, with the base of transistor T1 and one end of a resistor R5 whose second end is connected, in multiple, with one end of a resistor R9 and the collector of transistor T2. The collector of transistor T1 is connected, in multiple, with one end of a resistor R6 and one end of a resistor R4. The second end of resistor R6 is connected, in multiple, with the base of transistor T2 and one end of a resistor R10 whose second end is connected with the wiper arm of a variable resistor R12. A first end of the winding of resistor R12 is connected with a first end of a resistor R11 and the second end of the winding of resistor R12 is connected with the second end of previously mentioned resistor R13. The second end of above mentioned resistor R9 connects, in multiple, with the control-electrode of controlled rectifier SCR1 and with the first end of a resistor R8. The second ends of resistors R4, R8 and R11 connect, in multiple, with the cathode of rectifier SCR1, the second end of the winding of sensor SNS, and with previously mentioned terminal TM3.

The following are given as typical resistance values for the components comprising potentiometer R1 and the above mentioned resistors R2 through R14 discussed above.

| Component | Resistance (ohms) |
|---|---|
| R1 | –100 |
| R2 | 130 |
| R3 | 5,100 |
| R4 | 1,000 |
| R5 | 33,000 |
| R6 | 33,000 |
| R7 | 1,800 |
| R8 | 560 |
| R9 | 470 |
| R10 | 5,100 |
| R11 | 1,000 |
| R12 | 300 |
| R13 | 2,700 |
| R14 | 3,200–5,100 |

In the above traced circuits or circuitry provided between terminals TM2 and TM3, and including terminal TM4, it may be considered that the base of transistor R1 is connected to a voltage divider comprising resistors R3 and R5. Similarly, it may be considered that the base of transistor T2 is connected to a voltage divider comprising resistors R6 and R10. The first mentioned voltage divider may be considered to be connected across a voltage source whose output voltage is equal to the difference in instantaneous voltages appearing at the junction of resistor R2 and sensor SNS, and the corresponding instantaneous voltages appearing at the junction of resistor R9 and the collector of transistor T2. The second mentioned voltage divider may be considered to be connected across a voltage source whose output voltage is equal to the difference in instantaneous voltages appearing at the junction of resistor R4 and the collector of transistor T1, and the corresponding instantaneous voltages appearing at the wiper arm of resistor R12.

Transistor T1 and T2 operate as linear amplifiers with regeneration only during the interval when the supply voltage phase angle is between 25° and 30°. During such interval, the instantaneous voltages at the junction of R4 and R6, and the junction of R5 and R9, are both increasing due to the collector currents in transistors T1 and T2, respectively. If the instantaneous signal voltage at the R2–R3 junction is slightly less than the instantaneous reference voltage at the R10–R12 junction, the instantaneous base current in transistor T1 will be greater than the corresponding current in transistor T2. Due to transistor current amplification at such time, the instantaneous collector current of transistor T1 will be greater than the corresponding current of transistor T2 and the instantaneous voltage drop across R4 will be greater than the instantaneous voltage drop across resistor R8 plus resistor R9. Consequently, the instantaneous voltage at the junction of R6 and R10 will be forced very slightly higher and, simultaneously therewith, the instantaneous voltage at the junction of R3 and R4 will be forced very slightly lower. Regeneration proceeds very rapidly until transistor T1 is forced into saturation (maximum conduction) and transistor T2 is switched off. If, however, the instantaneous signal voltage at the R2–R3 junction is slightly greater than the instantaneous reference voltage at the R10–R12 junction, the instantaneous base current in transistor T1 will be less than the corresponding current in transistor T2. At such time, the instantaneous collector current of transistor T1 will be less than the corresponding current of transistor T2 and the instantaneous voltage drop across resistor R4 will be less than the instantaneous voltage drop across resistor R8 plus resistor R9. Consequently, the instantaneous voltage at the junction of R6 and R10 will be forced very slightly lower and, simultaneously therewith, the instantaneous voltage at the junction of R3 and R4 will be forced very slightly higher. Regeneration proceeds very rapidly until transistor T1 is switched off and transistor T2 is forced into saturation.

The two series connected resistors R8 and R9 are provided for the collector load of transistor T2 for the purpose of obtaining some degree of electrical isolation between the control-electrode-cathode circuit or gate of rectifier SCR1 and the collector of transistor T2. For example, during an interval that regeneration occurs, the peak voltage from the collector of transistor T2 across resistor R8 and R9 may reach a momentary value of about 0.70 volts even though transistor T2 is subsequently switched off when transistor T1 goes into saturation. If, the control-electrode of rectifier SCR1 is connected directly to the collector of transistor T2, it is possible that, during said regenerative interval, the peak voltage may have a value such that it would trigger SCR1 into conduction. Therefore, by connecting the control electrode of rectifier SCR1 to the junction of resistors R8–R9, the peak voltage at the control-electrode of the rectifier, during said regenerative interval, would have, for example, a maximum value of about 0.38 volts which is insufficient to inadvertently trigger SCR1 into conduction.

Previously mentioned potentiometer R1 determines the set-point temperature range of the system and resistor R2 fixes the lowest set-point temperature limit of the system. Resistor R12 is provided for initial calibration of the system at the highest set-point temperature and at a preselected maximum temperature limit for heating element HTE and a burner heated thereby. The total range of adjustment for resistor R12 is sufficient to compensate for all possible combinations of tolerances of the bridge network resistances comprising the resistances of sensor SNS, the total resistance of potentiometer R1 and resistor R2, and the total resistances of resistors R11, R12 and R13, as well as to compensate for differences in both the current gain and base-to-emitter junction potentials for transistors T1 and T2. At the nominal control point of the bridge network where such bridge is near balance, the instantaneous potential at the junction of resistor R2 and sensor SNS is substantially equal to the potential at the wiper arm of resistor R12. Both potentials are nominally 0.29 of the instantaneous amplitude of the voltage supplied to the bridge network to be discussed.

The system of the invention shown in FIG. 1 is the basic embodiment of the invention which may be used in conjunction with high thermal-mass burner and heating components such as a CALROD brand electric heating unit and an associated glass ceramic burner plate having a burner area heated by said unit. It is believed expedient to set forth at this point in the description an operational example of the basic embodiment of the invention shown in FIG. 1.

OPERATIONAL EXAMPLE OF THE BASIC EMBODIMENT OF

THE INVENTION (FIG. 1)

Referring to FIG. 1 of the drawings, it will be assumed that master switch is initially actuated to its closed or electric circuit closing position. At such time heating element HTE is energized from power source PS over normally closed contact a–b of thermal relay TR. Also at such time, the previously mentioned bridge network and transistors T1 and T2 are supplied with half wave voltage through a circuit which extends through heating winding 11 of relay TR, diode D, over terminal TM1 to terminal TM2 and thence to resistor R14, and through such resistor to potentiometer R1 and resistor R13. Said transistors T1 and T2 and said network are supplied with half wave voltages at a peak amplitude of nominally 10.3 volts during the positive half-cycles of the 120 volt line voltage through diode D1 due to the resistances of said heater winding or coil 11 (1,800 ohm) and of resistor R14 (adjusted to 3,200 ohm). As each positive half-cycle of voltage increased from zero (0) amplitude, there is a phase angle interval between 25° and 30° during which transistors function as a regenerative amplifier as previously mentioned. Regeneration is attained through emitter coupling resistor R7 and through collector to base coupling of the transistors by way of resistors R5 and R6. Either one, but only one, of the transistors can end up in a saturated or fully conducting state with the other transistor in an off condition or non-conducting state. Since the temperature of sensor SNS and, therefore, its resistance is below the set-point resistance value of potentiometer R1 when element HTE is initially energized, T1 will become saturated (conducting) and transistor T2 will be non-conducting for the remainder of each half-cycle of voltage supplied to the system. If, however, element HTE has been energized for a sufficient period of time that the resistance of sensor SNS is increased above said set-point resistance value selected by the setting of potentiometer R1, transistor T1 will be non-conducting and transistor T2 will become saturated or fully conducting. The states (conducting or non-conducting) of transistors T1 and T2 are, thus, determined each half-cycle. Because of the thermal inertia of the burner heating unit and burner plate, the resistance of sensor SNS, at the trip or average control point temperature of said unit and plate, is either increasing or decreasing. Consequently a hysterisis results in which erratic conduction cannot occur in transistors T1 and T2, during cooling and heating intervals, respectively.

When the temperature of sensor SNS is above the set-point temperature as selected by potentiometer R1, that is, when the resistance of sensor SNS exceeds the resistance provided by the setting of potentiometer R1, and transistor T2 is in saturation, the instantaneous voltage drop across resistor R8 at a phase angle of about 30° is sufficient to trigger or switch rectifier SCR1 to conducting for the remainder of the respective positive half-cycle, thereby sufficiently energizing heater winding or coil 11 of relay TR to cause such winding or coil to begin heating to, in turn, heat element 12 of the relay. For the conduction angle of nominally 150° for rectifier SCR1, the energy through winding or coil 11 is about 97 percent of that which would have existed if rectifier SCR1 had been triggered to conducting near 0° to give a 180° conduction angle. Within nominally 20 seconds, winding or coil 11 sufficiently heats element 12 of relay TR that such element actuates to open contacts a–b of the relay and heating element HTE is, thereby, deenergized. When sensor SNS cools below the selected set-point temperature, rectifier SCR1 does not conduct or is switched to non-conducting and heater winding or coil 11 will cool to, in turn, permit element 12 to cool which subsequently actuates contacts a–b of the relay to close and reenergize heating element HTE. Such cycling is repeated as long as master switch remains closed. If the selected set-point temperature is increased by readjusting potentiometer R1 to increase its resistance in the circuitry, heating element HTE is heated to a higher temperature than previously, before sensor SNS is heated to a sufficiently high temperature to cause switching of rectifier SCR1 to conducting. Therefore, element 12 of relay TR actuates contacts a–b of the relay to their open condition at a later point in time than previously to maintain the temperature of heating element HTE at the higher selected temperature. On the other hand, if the set-point temperature selected is decreased by readjusting potentiometer R1 to decrease its resistance in the circuitry, heating element HTE heats to the selected set-point temperature at an earlier point in time than previously, thereby sufficiently heating sensor SNS at an earlier point in time to, in turn, switch rectifier SCR1 to conducting at an earlier point in time than was previously done. Thus, element 12 of relay TR actuates contacts a–b of the relay to their open condition at an earlier point in time, than previously, to maintain the temperature of heating element HTE at the lower selected temperature.

Figure 1A:
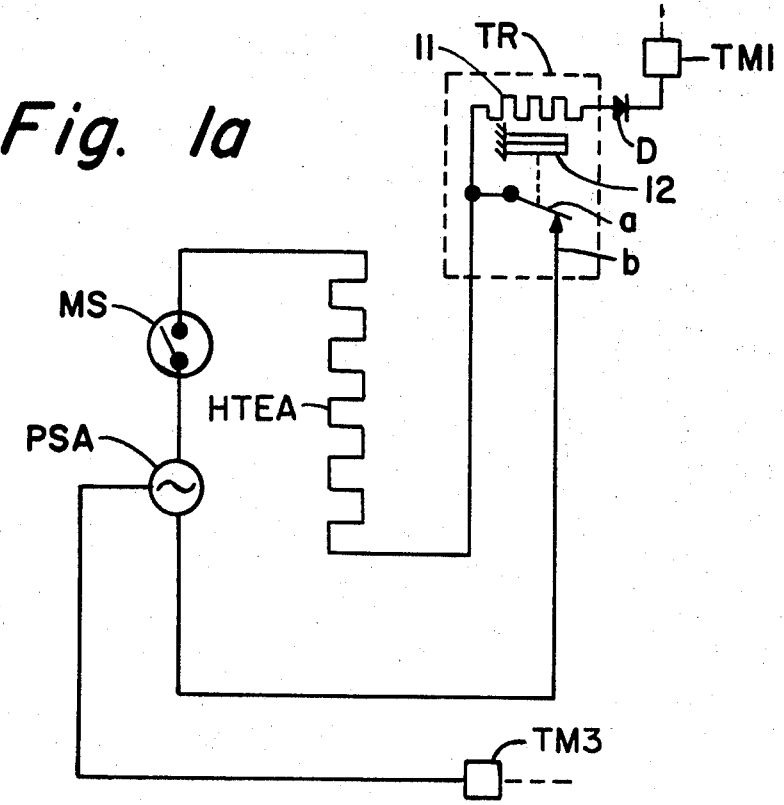
FIG. 1a comprises a schematic circuit diagram illustrating modifications of the embodiment of FIG. 1 for use with a 240 volt 60 c.p.s. alternating current source.

Referring now to FIG. 1a of the drawings, the 240 volt control system is quite similar to that of FIG. 1 except that the circuit for energizing an electrical resistance heating element HTEA extends from one terminal of a 240 volt, alternating current power source PSA through switch MS in its closed position, through heating element HTEA and contacts a–b of relay TR in their closed condition to the second side of the 240 volt power source PSA. Another or the (120V) terminal of the power source is connected to previously mentioned terminal TM3 which is also connected to the solid-state circuitry in the same manner as shown in FIG. 1. The remainder of the circuitry of the modification of FIG. 1a is identical to that described for the embodiment of FIG. 1. In view of the foregoing operational example given in conjunction with the embodiment of FIG. 1, only a brief operational example of the modification of FIG. 1a is necessary.

OPERATIONAL EXAMPLE OF THE MODIFICATION

OF FIG. 1a

It will be assumed that master switch MS is actuated to its closed or circuit closing condition. Current then flows through the previously traced circuit to energize heating element HTEA and such current continues to flow as long as contacts a–b of relay TR are closed. At the same time, half-cycles of current flow through winding 11 of relay TR and diode D, over terminal TM1 and through the circuitry including transistors T1 and T2 etc. (shown in FIG. 1) and over terminal TM3 which is, as previously pointed out, connected to the neutral terminal of power source PSA. Referring to FIG. 1a taken in conjunction with FIG. 1, when the temperature of heating element HTEA rises above the set-point temperature as selected by potentiometer R1, rectifier SCR1 is triggered to conducting and contacts a–b of relay TR are subsequently actuated open thereby interrupting the 240 volt energizing circuit for element HTEA. However, heater 11 of relay TR and the solid-state control circuitry (FIG. 1) remain energized by a circuit extending from said first side of power source PSA through switch MS, element HTEA, heater winding or coil 11 of relay TR, diode D, terminal TM1, and through the solid-state circuitry to terminal TM3 and thence to the neutral terminal of power source PSA. The 240 volt heating element HTEA has a nominal resistance of about 25 ohms and, therefore, at this time, the voltage drop across element HTEA is nominally 1.2 percent of the 120 volts supplied thereacross, thereby leaving 98.8 percent of the 120 volts available at heater winding or coil 11 of relay TR to maintain such winding or coil and the solid-state circuitry energized. When the temperature of element HTEA falls below the selected set point temperature, rectifier SCR1 ceases to conduct and contacts a–b of relay TR close following sufficient cooling of element 12 of relay TR to reenergize heating element HTEA from the 240 volt source. The solid-state control circuitry in the modification of FIG. 1a operates in the same manner as that previously described in conjunction with FIG. 1 and no further description of the operation of the modification of FIG. 1a is believed necessary.

Figure 2:
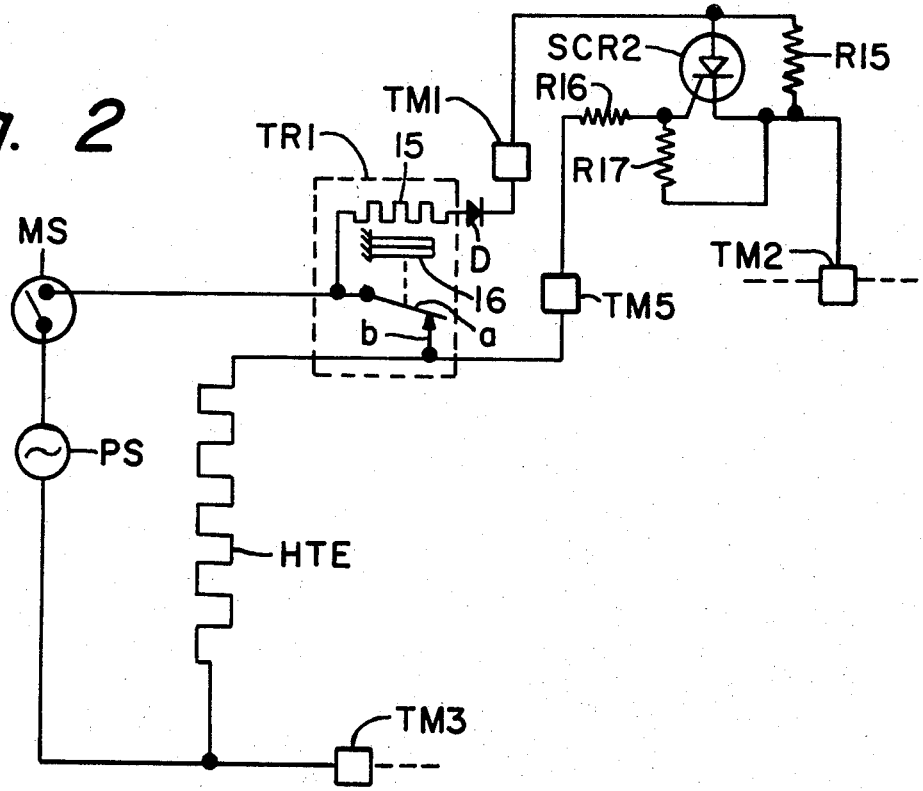
FIG. 2 is a schematic circuit diagram illustrating a second embodiment of the invention which may be provided by minor modifications in the embodiment of FIG. 1.

Referring now to FIG. 2, there is shown another embodiment of the invention which, with the exception that the heater winding or coil 15 of relay TR1 in FIG. 2 has, for example, a resistance of 900 ohms, is identical to the embodiment of FIG. 1 insofar as the circuits connected from the power source PS to terminals TM1 and TM3 are concerned. The circuits connected between terminals TM2 and TM3 in the embodiment of FIG. 2, with the exception of resistor R14 being adjusted to provide a 4,100 ohm resistance, are identical to the corresponding circuits of FIG. 1 and are, therefore, not shown in FIG. 2 for purposes of simplification of such drawing. There is, however, additional circuitry shown in FIG. 2 and comprising the following circuits. Terminal TM1 is connected, in multiple, with the anode of a second silicon controlled rectifier SCR2 and one end of a resistor R15 having a resistance, for example, of 1,200 ohms. The second end of resistor R15 is connected, in multiple, with terminal TM2, the cathode of rectifier of SCR2 and one end of a resistor R17 having a 1,000 ohm resistance, for example. The second end of resistor R17 is connected, in multiple, with the control electrode of rectifier SCR2 and one end of a resistor R16 having, for example, a 68,000 ohm resistance. The second end of resistor R16 is connected with a terminal TM5 which is also connected with fixed contact member b of relay TR1.

OPERATIONAL EXAMPLE OF THE EMBODIMENT

OF FIG. 2

When master switch MS is actuated to its closed or circuit closing condition, current is supplied through contacts a–b of relay TR1 to heating element HTE and through resistor R16 to the control electrode of rectifier SCR2 to trigger such rectifier to conducting. At such time and during the positive half-cycles of current supplied to diode D, such current flows through rectifier SCR2 to terminal TM2 and thence to terminal TM4 and resistor R14 (see FIG. 1). Resistor R15 (FIG. 2) is, at such time, by-passed or shunted out by rectifier SCR2. So long as the temperature of element HTE is below the set-point temperature as selected by the resistance setting of potentiometer R1 (FIG. 1) rectifier SCR1 (FIG. 1) is non-conducting and only the small current required for transistors T1 and T2 and the associated circuitry will flow through the circuit including 900 ohm heating coil or winding 15 of relay TR1, diode D, rectifier SCR2 and resistor R14. When, however, the temperature of element HTE rises above said selected set-point temperature, there will be a brief period of from 4 to 6 seconds during which rectifier SCR1 will be triggered to conducting or turned on and the heater coil or winding 15 of relay TR1 will be energized at about or nominally 80 volts to heat bi-metallic element 16 of such relay to subsequently actuate contacts a–b of the relay to their open condition and deenergize heating element HTE. Also when said contacts a–b open, the triggering current previously supplied through resistor R16 to the control electrode of rectifier SCR2 is terminated and such rectifier switches to its off or non-conducting condition and the current to heater winding or coil 15 of relay TR1 then flows through resistor R15 which results in lower power to said heater winding or coil than was previously supplied thereto during the heating of such winding or coil. Such lower power is, however, sufficient to maintain the heater winding or coil 15 sufficiently heated that contacts a–b of relay TR1 are held in their open or circuit interrupting condition. When heating element HTE and, consequently, sensor SNS cool below the selected set-point temperature, rectifier SCR1 (FIG. 1) switches off and heater winding or coil 15 of relay TR1 is no longer heated to a sufficient degree to sufficiently heat bimetallic element 16 to hold contacts a–b open. Such contacts then close upon sufficient cooling of element 16. By the use of resistor 15 and the selective shunting thereof by rectifier SCR2, heater coil or winding 15 of relay TR1 is energized by relatively high power to cause early actuation of contacts a–b of relay TR1 to their open condition after rectifier SCR1 is triggered to its conducting condition, ad said heater coil or winding is energized by relatively low power (through resistor R15) to hold said contacts open but to permit early actuation of contacts a–b to their closed condition when SCR1 switches off. It is pointed out that the embodiment of the invention shown in FIG. 2 is intended for use with burner and heating components having a low thermal mass and with which there must, therefore, be used a control system in which the heating element such as HTE must be reenergized at an early point in time following the falling of the temperature of the heating element below the selected set-point temperature.

Figure 2A:
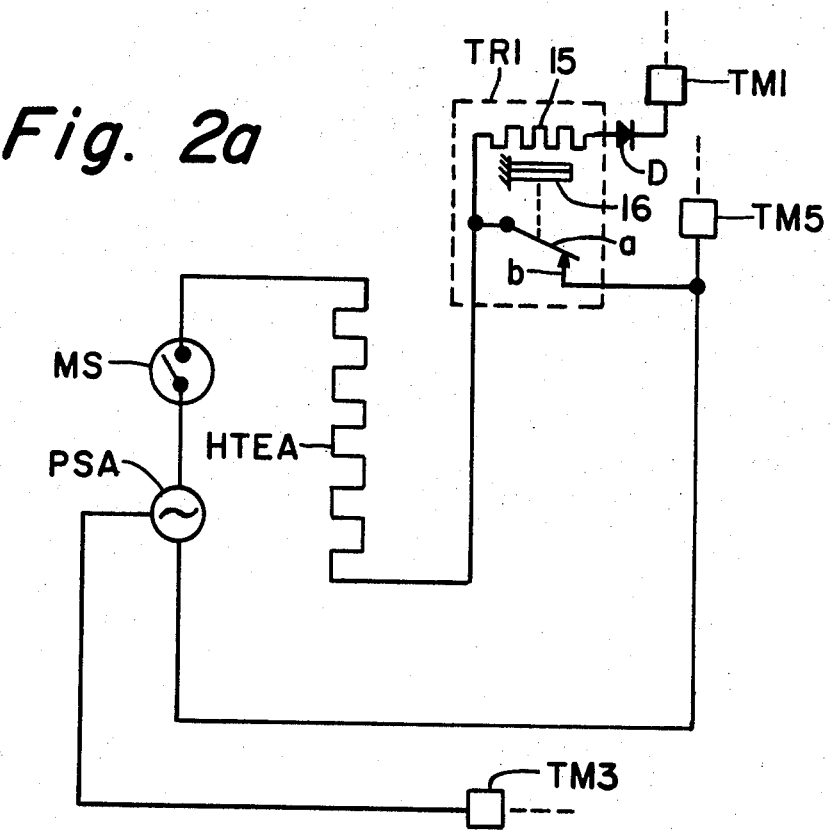
FIG. 2a comprises a schematic circuit diagram illustrating modifications of the embodiment of FIG. 2 for use with a 240 volt, 60 c.p.s. alternating current source.

As previously mentioned, FIG. 2a illustrates the embodiment of FIG. 2 modified for use with a 240 volt heating element HTEA and a 240 volt alternating current source as in the modification of FIG. 1a. Terminals TM1, TM3 and TM5 shown in FIG. 2a correspond, of course, to the respectively similarly designated terminals of FIG. 2. By a brief glance at FIG. 2a the similarity between the circuitry shown therein and that shown in FIG. 1a will be readily recognized and, therefore, it is not believed necessary to trace the circuitry shown in FIG. 2a in detail.

OPERATIONAL EXAMPLE OF THE MODIFICATION

OF FIG. 2a

The modification shown in FIG. 2a operates similarly to that previously described for FIG. 2 but it is pointed out that, in such modification, during periods when contacts a–b of relay TR1 are closed, the instantaneous polarity of the supply voltage from the 240 volt alternating current source PSA and supplied to the control electrode and the anode of rectifier SCR2, are of the same polarity and, therefore, rectifier SCR2 is triggered to conducting at such time to by-pass resistor R15. Furthermore, when contacts a–b of relay TR1 are open, the instantaneous polarity of the supply voltage to the control electrode of rectifier SCR2 is 180° out of phase with the instantaneous polarity of the supply voltage to the anode of rectifier SCR2 and, therefore, at such time, rectifier SCR2 is not triggered to conducting and resistor R15 is not by-passed. The modification shown in FIG. 2a is, similarly to the embodiment of the invention of FIG. 2, intended for use with burner and heating components having a low thermal mass.

Figure 3:
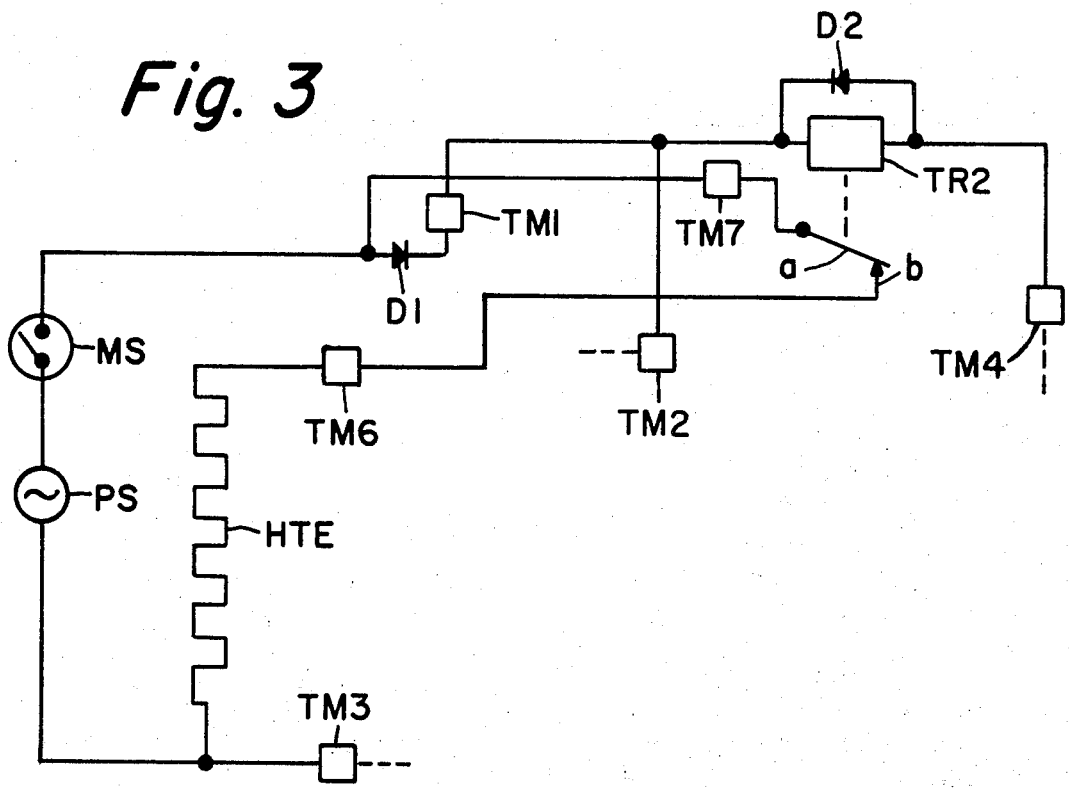
FIG. 3 is a schematic circuit diagram similar to FIG. 2 but illustrating a third embodiment of the invention.

FIG. 3 illustrates an embodiment of the invention using an electromagnetic type relay TR2 in place of the thermal type relays of the embodiments of FIGS. 1 and 2. In the embodiment of FIG. 3, one terminal of the 120 volt alternating current power source PS is connected with the movable contact member of master switch MS whose fixed contact member is connected, in multiple, with a terminal TM7 and through a diode D1, in its low resistance direction, with terminal TM1. Terminal TM1 is also connected with a first or positive input side of the control winding of, for example, a 48 volt direct current electromagnetic relay TR2. The second or negative side of the control winding of relay TR2 is connected with terminal TM4. Previously mentioned terminal TM7 is connected with a movable contact member a of relay TR2 which makes contact with a fixed contact member b of such relay when the winding of the relay is deenergized. When relay TR2 is energized, as hereinafter described, contact member a breaks A BREAKS contact with contact member b to open a circuit which extends from previously mentioned terminal TM7 through contacts a–b of relay TR2 in their closed condition to a terminal TM6 and thence to one end of heating element HTE whose second end is connected with terminal TM3 and the second terminal of power source PS.

Figure 3A:
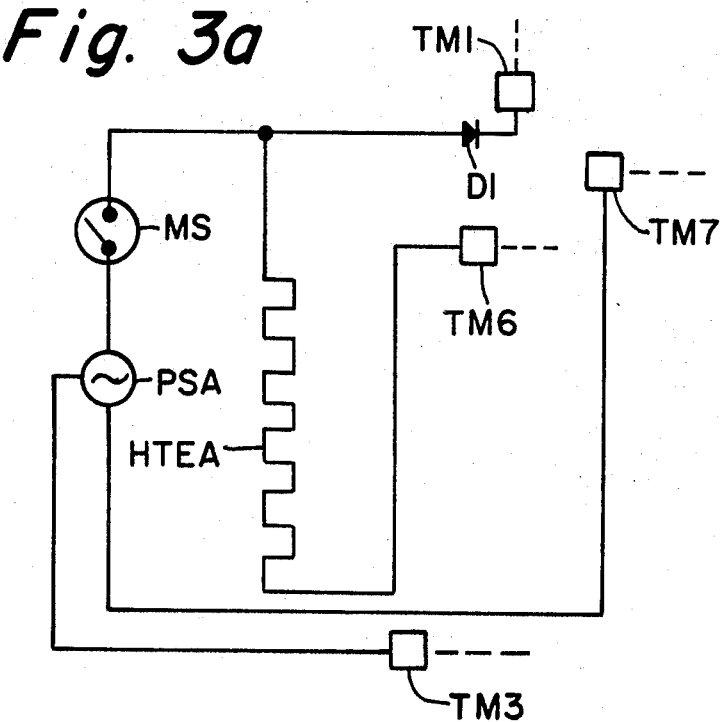
FIG. 3a is a schematic circuit diagram illustrating modifications of the embodiment of FIG. 3 for use with a 240 volt 60 c.p.s. alternating current source.

FIG. 3a is a modification of the embodiment of FIG. 3 used in conjunction with the 240 volt alternating current power source PSA and the 240 volt heating element HTEA. In such modification, one terminal of power source PSA is connected directly with previously mentioned terminal TM7. The other terminal of such power source is connected through master switch MS with one end of element HTEA and through aforesaid diode D1, in its low resistance direction, with terminal TM1. The second end of heating element HTEA is connected with the aforesaid terminal TM6. Another or the neutral (120V) terminal of power source PSA is connected with terminal TM3.

In the arrangements illustrated in FIGS. 3 and 3a of the drawings, terminals TM2 and TM4 correspond, of course, to the similarly designated terminals shown in FIG. 1, and the circuitry between such terminals and terminal TM3 in FIGS. 3 and 3a is identical to that shown between such terminals in FIG. 1 with the exception that variable resistor R14 is adjusted to provide about a 5,000 ohm resistance in the circuitry.

OPERATIONAL EXAMPLES OF THE EMBODIMENT OF

FIG. 3 AND THE MODIFICATION OF FIG. 3a

Referring first to FIG. 3 it will be assumed that master switch MS is actuated to its closed or circuit closing condition and alternating current is thereby supplied from power source PS over contacts a–b of relay TR2 to energize heating element HTE. At the same time half-cycles of alternating current are supplied to the solid-state circuitry including transistors T1 and T2, and through the control winding of relay TR2 to the anode of rectifier SCR1 (See FIG. 1). Such rectifier is not conducting at such time however and, therefore, no current flows through such rectifier nor through the control winding of relay TR2. When element HTE reaches the set-point temperature as selected by the setting of potentiometer R1 (FIG. 1) and sensor SNS is correspondingly heated, rectifier SCR1 is triggered to conducting in the same manner as previously described and the positive half cycles of alternating current supplied through diode D1 to the winding of relay TR2 flow through such winding and rectifier SCR1 to terminal TM3 and thence to the second terminal of power source PS. Relay TR2 is thereby energized to actuate to open its contacts a–b and interrupt the energizing circuit for heating element HTE. Diode D2, connected across the control winding of relay TR2, enables such relay to bridge the periods when the half-cycles of power from the first terminal of source PS are negative with respect to the second terminal of such source. When heating element HTE and, consequently, sensor SNS cool sufficiently, rectifier SCR1 switches to off or its non-conducting condition and the current through the winding of relay TR2 is terminated. Relay TR2 consequently releases and closes its contacts a–b to again close the energizing circuit for heating element HTE. Such cycling continues, of course, until master switch MS is reactuated to its open condition.

Referring now to FIG. 3a, taken in conjunction with FIG. 3, when master switch MS is closed, 240 volt heating element HTEA is energized from 240 volt alternating current power source PSA over contacts a–b of relay TR2 in their closed condition. Alternate half-cycles of said current also flow through diode D1 and the winding of relay TR2 to the solid state circuitry, including transistors T1 and T2, and the anode of rectifier SCR1 (FIG. 1) which is non-conducting at such time. The modification of FIG. 3a subsequently operates similarly to that described for the embodiment of FIG. 3 and no detailed discussion of such operation is, therefore, believed necessary.

Figure 4:
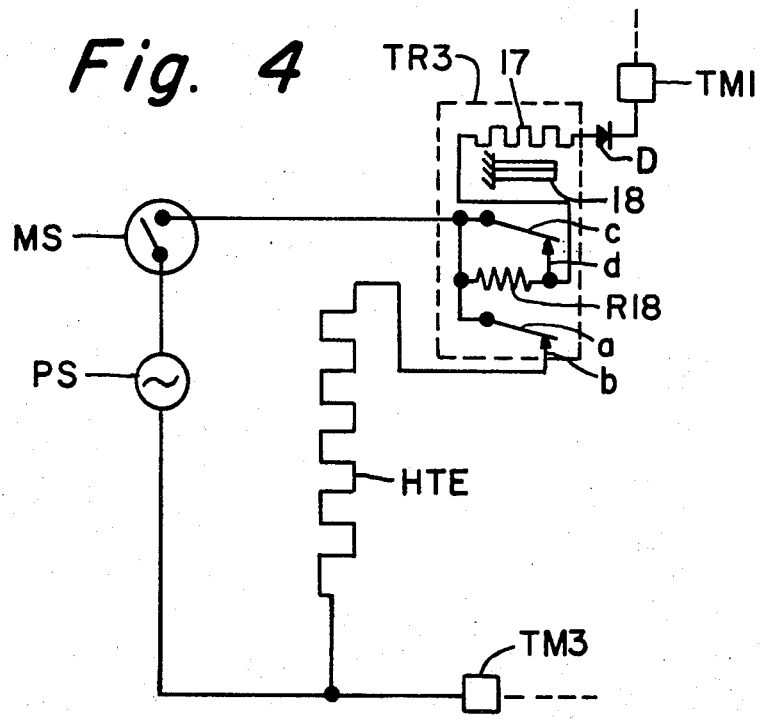
FIG. 4 is a schematic circuit diagram illustrating a fourth embodiment of the invention suitable for use with a 120 volt, 60 c.p.s. alternating current source.
Figure 4A:
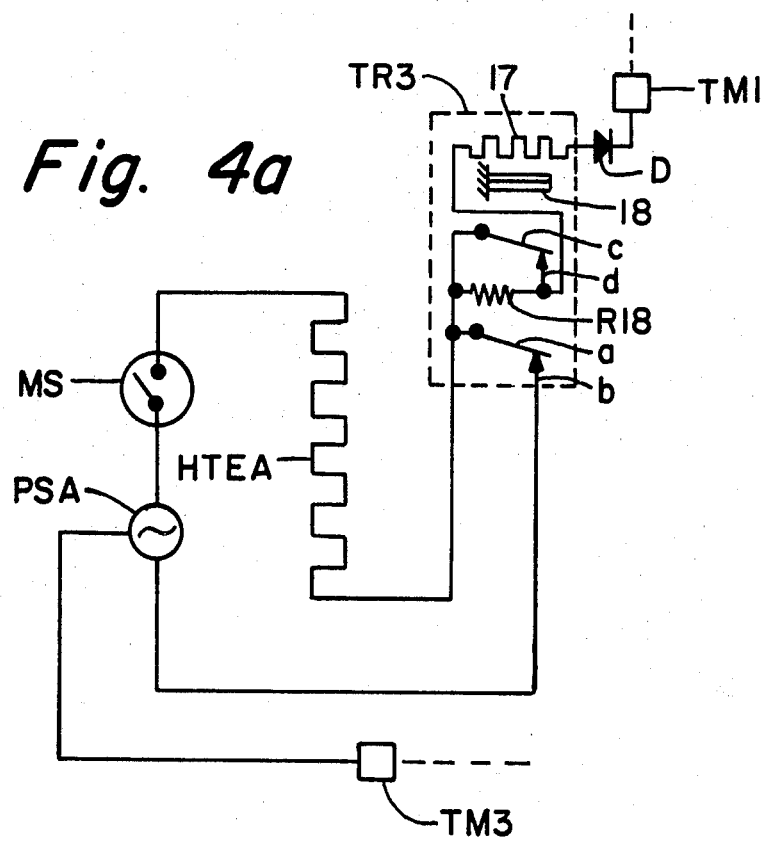
FIG. 4a is a schematic circuit diagram illustrating modifications of the embodiment of FIG. 4 for use with a 240 volt, 60 c.p.s. alternating current source.

The invention embodiment and modification thereof shown in FIGS. 4 and 4a, respectively, are intended, similarly to the invention and modification thereof shown in FIGS. 2 and 2a, respectively, for use with for burner and heating components having a low thermal mass. Referring to FIG. 4, it will be noted that the arrangement shown therein is similar to that of FIG. 1 with the exceptions that there is provided a relay TR3, having a 900 ohm resistance and two sets of associated contacts a–b and c–d, and there is provided an additional resistor R18, corresponding to resistor R15 of FIGS. 2 and 2a. A first terminal of 120 volt power source PS is connected with the movable contact member of switch MS whose fixed contact is connected, in multiple, with one end of resistor R18 and the movable contact members a and c of relay TR3. The second terminal of power source PS is connected, in multiple, with one end of a 120 volt heating element HTE and terminal TM3 which corresponds, for example, to terminal TM3 of FIG. 1. Fixed contact member b of relay TR3 is connected with the second end of element HTE while fixed contact member d of relay TR3 connects, in multiple, with the second end of resistor R18 and a first end of heater winding or coil 17 of relay TR3. The second end of winding or coil 17 connects through diode D with terminal TM1. Diode D and terminal TM1 correspond, respectively, to the correspondingly designated components of FIG. 1.

Referring to FIG. 4a, terminals TM1 and TM3, diode D, relay TR3 and resistor R18 correspond to the similarly designated components of FIG. 4 as is readily apparent. A first terminal of 240 volt power source PSA is connected with the movable contact member of switch MS and the fixed contact member of such switch is connected with one end of 240 volt heating element HTEA. Another or second terminal of 240 volt power source PSA is connected with fixed contact member b of relay TR3 and the neutral terminal of the power source is connected with terminal TM3. Movable contact member a of relay TR3 connects, in multiple, with the second end of element HTEA, with one end of resistor R18 and with movable contact member c of relay TR3. Fixed contact member d of the relay connects, in multiple, with the second end of resistor R18 and the first end of winding or coil 17 of relay TR3. It is pointed out that the circuitry between terminals TM1 and TM3 of FIGS. 4 and 4a corresponds to the solid!-state circuitry between terminals TM1 and TM3 of FIG. 1 except that resistor R14 (FIG. 1) is now set to provide a resistance of 4,100 ohms. Element 18 of relay TR3 of FIGS. 4 and 4a corresponds to element 12 of relay TR1 of FIG. 1.

OPERATIONAL EXAMPLES OF THE EMBODIMENT OF

FIG. 4 AND THE MODIFICATION OF FIG. 4a

Referring to FIG. 4, it will be assumed that switch MS is now actuated closed. Current is supplied from source PS across heating element HTE for energizing and heating thereof. During the half-cycles that the current from the first terminal of source PS is positive with respect to the second terminal of such source, current flows through contacts c–d of relay TR3 and through diode D1 to terminal TM1 and thence through the solid-state circuitry shown in FIG. 1 to terminal TM3 and the second terminal of PS. Such current sufficiently energizes the solid-state circuitry for its operation as previously described but, rectifier SCR1 being in its off condition at this time, insufficient current flows through winding or coil 17 of relay TR3 to heat it to, in turn, heat element 18 to actuate the contacts of the relays to their open condition.

When heater HTE reaches the set-point temperature selected by the setting of potentiometer R1 (FIG. 1) and sensor SNS is correspondingly heated, rectifier SCR1 is triggered to conducting as previously described and sufficient current then flows through winding or coil 17 of relay TR3 to sufficiently heat bimetallic element 18 to subsequently actuate such element to actuate contacts a–b and c–d of the relay to their open condition. Heating element HTE is thereby deenergized while winding or coil 17 of relay TR3 is maintained sufficiently energized through resistor R18 to sufficiently heat element 18 to maintain contacts a–b and c–d to their open condition. When element HTE and consequently sensor SNS cool sufficiently, rectifier SCR1 is returned to its non-conducting state and heater or winding 17 of relay TR3 is no longer sufficiently energized and heated to hold contacts a–b and c–d of the relay open. Because of the low energization of winding or coil 17 at this time due to the resistance of resistor R18, element 18 of relay TR3 cools relatively rapidly and reactuates said contacts of relay TR3 to their closed condition to reenergize heating element HTEA at an early point in time following the switching of rectifier SCR1 to non-conducting. Such point in time occurs earlier than in the embodiment of FIG. 1 and, for this reason, the embodiment of FIG. 4 is, as previously mentioned, provided for heating systems having low thermal mass and wherein a heating element such as HTE must, therefore, be reenergized at an early point in time following the switching of rectifier SCR1 to non-conducting so that the heating element and the burner associated therewith will be maintained, to the extent possible, at the selected set-point temperature therefor. In heating element and associated burner combinations having high thermal mass as previously mentioned, the element and associated burner remain at or near their selected set-point temperature for a longer period of time thus allowing for later closure of the contacts controlling the energization of the high thermal mass heating element and associated burner.

Referring to FIG. 4a, the arrangement shown therein operates in a manner similar to that discussed for the embodiment of FIG. 4 with the exception that, when contacts a–b and c–d of relay TR3 are open, heater winding or coil 17 of the relay is maintained heated by a circuit extending from master switch MS through element HTEA and thence through resistor R18 to heater winding or coil 17 as in the arrangement of FIG. 1a.

It is pointed out that although the embodiments of the invention illustrated in FIGS. 2, 2a, 4 and 4a are primarily intended for use with heating elements and associated burners having low thermal mass, such embodiments of the invention can, if desired, be used with similar such components having a high thermal mass.

Although there is herein shown and described only several forms of apparatus or systems embodying the invention, it will be understood that various changes and modifications may be made therein within the purview of the appended claims without departing from the spirit and scope thereof.

I claim:

1. A temperature control system for energizing an electrical resistance heating element from a conventional commercial source of alternating current and regulating the temperature of such heating element to maintain such temperature at or near a selected set-point temperature therefor, such system comprising, in combination;

I. a Wheatstone-type bridge circuit including,
   a. a wire having a relatively high temperature coefficient of electrical resistance disposed in thermal transfer relationship with said heating element and forming a first arm of said bridge circuit,
   b. adjustable electrical resistance means forming a second arm of said bridge circuit adjacent said first arm and for selecting said set-point temperature, and
   c. variable electrical resistance means forming third and fourth adjacent arms of said bridge circuit and for calibration thereof;

II. a differential switching amplifier including a pair of first and second similar transistors having their emitters connected with each other;

III. first electrical resistance means connecting the base of said first transistor with the junction of said first and second arms of said bridge circuit;

IV. second electrical resistance means connecting the base of said second transistor with the junction of said third and fourth arms of said bridge circuit;

V. third electrical resistance means connecting said emitters with the junction of said second and third arms of said bridge circuit;

VI. fourth and fifth electrical resistance means connecting the collectors of said first and second transistors, respectively, with the bases of the second and first transistors, respectively;

VII. sixth and seventh electrical resistance means connecting the collectors of said first and second transistors, respectively, with the junction of said first and fourth arms of said bridge circuit and with one terminal of said alternating current source;

VIII. a silicon-controlled rectifier having its cathode connected with said one terminal of said alternating current source and its control electrode connected through electrical resistance means with the collector of said second transistor;

IX. a variable electrical resistance connecting the junction of said second and third arms of said bridge circuit with the anode of said rectifier;

X. an electrically actuated switch having a control winding and normally closed electrical circuit controlling contacts actuable to open when said control winding is energized through said rectifier;

XI an electrical asymmetric unit;

XII. first series circuit means connecting the anode of said rectifier with a second terminal of said alternating current source, such circuit means including in series said control winding and said asymmetric unit with the low resistance direction of such unit being in a direction from said second terminal of the alternating current source towards said anode; and XIII. second series circuit means connecting said heating element through said electrical circuit controlling contacts across said source of alternating current.

2. A temperature control system in accordance with claim 1 and in which said electrically actuated switch is an electromagnetic type relay.

3. A temperature control system in accordance with claim 1 and in which said electrically actuated switch is a thermal-type relay having a control winding which is heated by electrical current to actuate said electrical circuit controlling contacts to open.

4. A temperature control system in accordance with claim 3 and further comprising eighth electrical resistance means included in series in said first series circuit means when said electrical circuit controlling contacts of said relay are open.

5. A temperature control system for energizing an electrical resistance heating element from a conventional commercial source of alternating current and regulating the temperature of such heating element to maintain such temperature at or near a selected set-point temperature therefor, such system comprising, in combination;
 I. a Wheatstone-type bridge circuit including,
  a. a wire having a relatively high temperature coefficient of electrical resistance disposed in thermal transfer relationship with said heating element and forming a first arm of said bridge circuit,
  b. adjustable electrical resistance means forming a second arm of said bridge circuit adjacent said first arm and for selecting said set-point temperature, and
  c. variable electrical resistance means forming third and fourth adjacent arms of said bridge circuit and for calibration thereof;
 II. a differential switching amplifier including a pair of first and second similar transistors having their emitters connected with each other;
 III. first electrical resistance means connecting the base of said first transistor with the junction of said first and second arms of said bridge circuit;
 IV. second electrical resistance means connecting the base of said second transistor with the junction of said third and fourth arms of said bridge circuit;
 V. third electrical resistance means connecting said emitters with the junction of said second and third arms of said bridge circuit;
 VI. fourth and fifth electrical resistance means connecting the collectors of said first and second transistors respectively, with the bases of the second and first transistors, respectively;
 VII. sixth and seventh electrical resistance means connecting the collectors of said first and second transistors, respectively, with the junction of said first and fourth arms of said bridge circuit and with one terminal of said alternating current source;
 VIII. a silicon-controlled rectifier having its cathode connected with said one terminal of said alternating current source and its control electrode connected through electrical resistance means with the collector of said second transistor;
 IX. a variable electrical resistance connecting the junction of said second and third arms of said bridge circuit with the anode of said rectifier;
 X. an electrically actuated switch having a control winding and electrical circuit controlling contacts actuable from electrical circuit closing to opening conditions;
 XI. first circuit means for supplying half-cycles of alternating current from a second terminal of said current source through said control winding to said anode of said rectifier; and
 XII. second circuit means connecting said heating element through said electrical circuit controlling contacts across said alternating current source to energize such heating element for heating thereof when such contacts are closed.

6. A temperature control system in accordance with claim 5 and in which said electrically actuated switch is an electromagnetic type relay.

7. A temperature control system in accordance with claim 5 and in which said electrically actuated switch is a thermal-type relay having a control winding which is heated by electrical current to actuate said electrical circuit controlling contacts to open.

8. A temperature control system in accordance with claim 7 and further comprising eighth electrical resistance means included in series in said first circuit means when said electrical circuit controlling contacts of said relay are open.

* * * * *